(12) United States Patent
Yan et al.

(10) Patent No.: US 12,406,533 B2
(45) Date of Patent: Sep. 2, 2025

(54) FINGERPRINT ENROLLING METHOD AND FINGERPRINT ENROLLING DEVICE

(71) Applicant: SAMSUNG ELECTRONICS CO., LTD., Suwon-si (KR)

(72) Inventors: Xiaochun Yan, Xi'an (CN); ChunMiao Jiang, Xi'an (CN); Hanhui Li, Xi'an (CN); Huaiwen Bai, Xi'an (CN); Jiangbo Chen, Xi'an (CN); Wenyan Zheng, Xi'an (CN); Yanjun Chen, Xi'an (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/823,213

(22) Filed: Sep. 3, 2024

(65) Prior Publication Data
US 2025/0174048 A1   May 29, 2025

(30) Foreign Application Priority Data

Nov. 24, 2023  (CN) .......................... 202311587806.0

(51) Int. Cl.
*G06V 40/50* (2022.01)
*G06V 10/98* (2022.01)
*G06V 40/12* (2022.01)
*G06V 40/13* (2022.01)

(52) U.S. Cl.
CPC ............ *G06V 40/50* (2022.01); *G06V 10/993* (2022.01); *G06V 40/13* (2022.01); *G06V 40/1335* (2022.01)

(58) Field of Classification Search
CPC .. G06V 40/50; G06V 10/993; G06V 40/1335; G06V 40/13–1394
See application file for complete search history.

(56) References Cited

U.S. PATENT DOCUMENTS

| | | | |
|---|---|---|---|
| 7,260,247 | B2 | 8/2007 | Kita |
| 10,061,971 | B2 | 8/2018 | Li et al. |
| 10,210,374 | B1 * | 2/2019 | Lee ...................... G06V 10/143 |
| 10,346,669 | B2 | 7/2019 | Jiang et al. |
| 2007/0160263 | A1 * | 7/2007 | Abiko ................ G06V 40/1329 |
| | | | 382/115 |
| 2015/0074615 | A1 | 3/2015 | Han et al. |
| 2015/0235098 | A1 * | 8/2015 | Lee .................... G06V 40/1306 |
| | | | 715/709 |

(Continued)

FOREIGN PATENT DOCUMENTS

| | | | | |
|---|---|---|---|---|
| EP | 731426 | A2 * | 9/1996 | ............. G06F 21/32 |
| EP | 1022681 | A1 * | 7/2000 | ............... G06K 7/00 |

(Continued)

*Primary Examiner* — Premal R Patel
(74) *Attorney, Agent, or Firm* — Morgan, Lewis & Bockius LLP (57) ABSTRACT

A fingerprint enrolling method includes controlling a smart card having a fingerprint sensor disposed therein to capture a first fingerprint image of a finger at a first position. The smart card is controlled to move to a second position to capture a second fingerprint image of the finger at the second position when the first fingerprint image is successfully captured. The fingerprint enrolling method according to the disclosure enhances the user experience, increases the diversity of enrolling the fingerprint templates, and increases accuracy rate of the matching.

20 Claims, 9 Drawing Sheets

(56) References Cited

U.S. PATENT DOCUMENTS

| | | |
|---|---|---|
| 2016/0234430 A1 | 8/2016 | Setterberg |
| 2017/0032169 A1 | 2/2017 | Pi et al. |
| 2017/0124408 A1* | 5/2017 | Hogan ............... G06V 40/1324 |
| 2018/0137332 A1 | 5/2018 | Andersen et al. |
| 2021/0035109 A1* | 2/2021 | Wong .................. G07F 7/0833 |

FOREIGN PATENT DOCUMENTS

| | | |
|---|---|---|
| JP | 4857164 B2 | 1/2012 |
| JP | 2020-131520 A2 | 8/2020 |

* cited by examiner

FINGERPRINT ENROLLING METHOD AND FINGERPRINT ENROLLING DEVICE

CROSS-REFERENCE TO RELATED APPLICATIONS

The present application claims priority under 35 U.S.C. § 119 to Chinese Patent Application No 202311587806.0, filed on Nov. 24, 2023, the entire contents of which are herein incorporated by reference.

TECHNICAL FIELD

The disclosure relates to a field of fingerprint technology, and in particular to a fingerprint enrolling method and a fingerprint enrolling device.

DISCUSSION OF THE RELATED ART

A fingerprint is highly secure biometric feature that may be used for authentication in making financial payment. A smart card with a function of fingerprint recognition integrates a fingerprint sensor and a microprocessor, and the fingerprint sensor supports capture of fingerprint information of a user. At the time of verification, the user only needs to use the fingerprint for matching and does not need to enter a password. In order to reduce cost, the fingerprint sensor on the smart card has a small area that might not cover the whole fingerprint, and only partial region of the fingerprint image may be acquired at one capture. The smart card may store an image of the user's fingerprint beforehand for use in verification. This stored version of the fingerprint may be referred to herein as a template. A problem might occur, due to the small size of the fingerprint sensor, that there might be little to no overlap between the fingerprint read from the user at the time of the verification (the "verification fingerprint") and the stored template. This reduced overlap might therefore lead to unsuccessful authentication. This problem may be minimized by acquiring a set of diverse templates, rather than a single template, thereby increasing the likelihood that the verification fingerprint matches one of the stored templates. In order to achieve this purpose, the various templates should feature different areas of the finger and should include the finger from a plurality of different angles.

Currently, when enrolling the fingerprint templates, methods of an instruction manual, a software algorithm, software-hardware combination and so on are used to ensure that a plurality of the enrolled fingerprint templates are adequately diverse. The above methods cannot accurately calculate the degree to which the fingerprint templates overlap, nor can they accurately control finger movement and rotation. This results in many enrollments during the enrolling fingerprint procedure of the user being abandoned due to an oversized overlap area, and thus requiring the user to enroll multiple times, which seriously affects user experience and final results.

SUMMARY

A fingerprint enrolling method is applied to a fingerprint enrolling device. The method includes controlling a smart card having a fingerprint sensor to capture a first fingerprint image of a finger at a first position. The smart card is moved to a second position to capture a second fingerprint image of the finger at the second position when the first fingerprint image is successfully captured.

The method may further includes controlling the smart card to move to a next position, among a specified number of positions, to capture a fingerprint image of the finger, when the first fingerprint image is not successfully captured. The first position and the second position are two consecutive positions among the specified number of positions.

The specified number of positions may be determined based on a translational position and/or a rotational angle of the smart card.

The method may further include receiving, from the smart card, a signal indicating that the first fingerprint image is successfully captured. The controlling the smart card to move to the second position to capture the second fingerprint image of the finger at the second position when the first fingerprint image is successfully captured may include controlling the smart card to move to the second position to capture the second fingerprint image of the finger at the second position when the signal is received.

The signal may be generated based on the first fingerprint image satisfying a predetermined condition, the predetermined condition may include a quality of the first fingerprint image satisfying a predetermined quality requirement.

The first fingerprint image of the finger may be recaptured by the smart card at the first position when the first fingerprint image is not successfully captured.

The fingerprint enrolling device may include an actuator, the controlling of the smart card to move may include controlling movement of the actuator to drive the smart card to move to the second position.

A fingerprint enrolling device is provided, the device includes a movement controller, the movement controller configured to control a smart card having a fingerprint sensor to capture a first fingerprint image of a finger at a first position and control the smart card to move to a second position to capture a second fingerprint image of the finger at the second position when the first fingerprint image is successfully captured.

The movement controller may be further configured to control the smart card to move to a third position among a specified number of positions to capture a fingerprint image of the finger, when it is determined that the first and second fingerprint images are not sufficient. The first position and the second position may be two consecutive positions among the specified number of positions.

The specified number of positions may be determined based on a translational position and/or a rotational angle of the smart card.

The device may further include a signal receiver, the signal receiver configured to receive from the smart card a signal indicating that the first fingerprint image is successfully captured. The movement controller is further configured to control the smart card to move to the second position to capture the second fingerprint image of the finger at the second position when the signal is received.

The signal may be generated when the first fingerprint image satisfies a predetermined condition, the predetermined condition including a quality of the first fingerprint image satisfying a predetermined quality requirement.

The first fingerprint image of the finger may be recaptured by the smart card at the first position when the first fingerprint image is not successfully captured.

The device may further include an actuator, the actuator being configured to drive the smart card to move under the control of the movement controller.

A computer-readable storage medium is provided. The computer program is stored thereon. The program, when executed, implements a fingerprint enrolling method applied to a fingerprint enrolling device. The method includes controlling a smart card having a fingerprint sensor to capture a first fingerprint image of a finger at a first position. The smart card is moved to a second position to capture a second fingerprint image of the finger at the second position when the first fingerprint image is successfully captured.

BRIEF DESCRIPTION OF THE DRAWINGS

The accompanying drawings herein are incorporated into and form part of the specification, illustrate embodiments consistent with the disclosure, which are used in conjunction with the specification to explain the principles of the disclosure and do not constitute an undue limitation of the disclosure.

DETAILED DESCRIPTION

In order to enable a person of ordinary skill in the art to better understand the technical solutions of the disclosure, the technical solutions provide by embodiments of the disclosure will be clearly and completely described below in conjunction with the accompanying drawings.

It should be noted that the terms "first", "second", etc. in the specification and claims of the disclosure and the accompanying drawings above may be used to distinguish similar objects rather than to describe a particular order or sequence. It should be understood that data so distinguished may be interchanged, where appropriate, so that embodiments of the disclosure described herein may be implemented in an order other than those illustrated or described herein. Embodiments described in the following examples do not represent all embodiments that are consistent with the disclosure. Rather, they are examples of devices and methods that are consistent with some aspects of the disclosure.

It should be noted herein that "at least one of the several items" in this disclosure includes "any one of the several items", "any combination of the several items" and "all of the several items" the juxtaposition of these three categories. For example, "including at least one of A and B" includes the following three juxtapositions: (1) including A; (2) including B; (3) including A and B. Another example is "performing at least one of step one and step two", which means the following three juxtapositions (1) performing step one; (2) performing step two; (3) performing step one and step two.

When enrolling fingerprint templates, a plurality of fingerprint images may be captured by a fingerprint sensor, and then key information from the plurality of the fingerprint images is extracted respectively to generate corresponding fingerprint templates which are then stored. Methods may use user instructions, a software algorithm, and hardware-software combination to ensure that the fingerprint templates have a low degree of overlap, and therefore represent more useful information. For example, a display is used to guide the user to move a finger or an algorithm is used to stitch fingerprints together.

The user instructions may requires the user to translate (i.e., move) and rotate the finger according to the instructions provided. However, a translational distance and a rotational angle of the finger (for example, leftward rotation of 20 degrees) are different for different users, which results in the translational distance and the rotational angle of the finger being different from the expectation, and it is difficult to accurately ensure the overlap degree of the enrolled fingerprint templates in the end. Therefore this approach may offer low accuracy and poor outcomes.

The software algorithm may two implementation methods, the first one is to use a matching score of matching the fingerprint template to be enrolled to the already-enrolled fingerprint template(s) (e.g., the more the two templates overlap, the higher the score) to determine the overlap degree, and the second one is to calculate overlap area between the fingerprint template to be enrolled and the already-enrolled fingerprint template to determine the overlap degree. Wherein the first method sets an upper threshold and a lower threshold for matching, and when the matching score of the fingerprint template to be enrolled to the already-enrolled fingerprint template is lower than the upper threshold and higher than the lower threshold, the fingerprint template to be enrolled is accepted and added to the enrolled templates. It is noted that, low-quality fingerprints will be enrolled if the threshold is too low; and fingerprints with too much overlap will be enrolled if the threshold is too high, and the effect will be unstable. The second method utilizes matching (e.g., the matching score of the fingerprint templates to be enrolled and the already-enrolled fingerprint templates, according to the first method, exceed a certain threshold), followed by determining the size of the overlap area between the fingerprint templates to be enrolled and the already-enrolled fingerprint templates through fusion. However, the smart card might not be able to provide the computational power needed because of the large amount of computation under the requirement of high accuracy. The computing power of the smart card is might be limited and might not be able to perform image computation quickly, and the accuracy may be low in all cases that the overlap degree of the templates is computed in the card.

A scheme of the hardware-software combination is based on the software algorithms using the hardware to give the user certain instructions. Generally, an indicator light or a display is used to indicate the translational direction of the user's finger. This method may still require the software algorithm to calculate the size of the overlap area between the fingerprint template to be enrolled and the enrolled fingerprint template, and it is difficult to accurately control the translational distance and the rotational angle of the user's finger.

The above methods start with software calculations and then determine the movement and the rotation of the finger. These methods might neither accurately calculate the overlap degree of the templates nor accurately control the movement and the rotation of the finger. This results in many enrollment attempts during the enrolling fingerprint procedure of the user being abandoned due to an oversized overlap area, and thus requiring the user to enroll multiple times, which seriously affects user experience and final results.

To address the above problems, one or more example embodiments of the disclosure provide a fingerprint enrolling method and a fingerprint enrolling device, in which a desired fingerprint is enrolled as the template accurately according to preset parameters (e.g., parameters of a translational position and a rotational angle), by controlling the movement of the smart card (e.g., translation and rotation) instead of the user's finger. According to this approach, there would be no need for the user to move the finger according to provided instructions, no need for the software to calculate the overlap degree of the fingerprints, and no need for the hardware to prompt the user to move the finger, which enhances the user experience, increases the diversity of the enrolled fingerprint templates, and increases accuracy rate of the matching.

Figure 1:
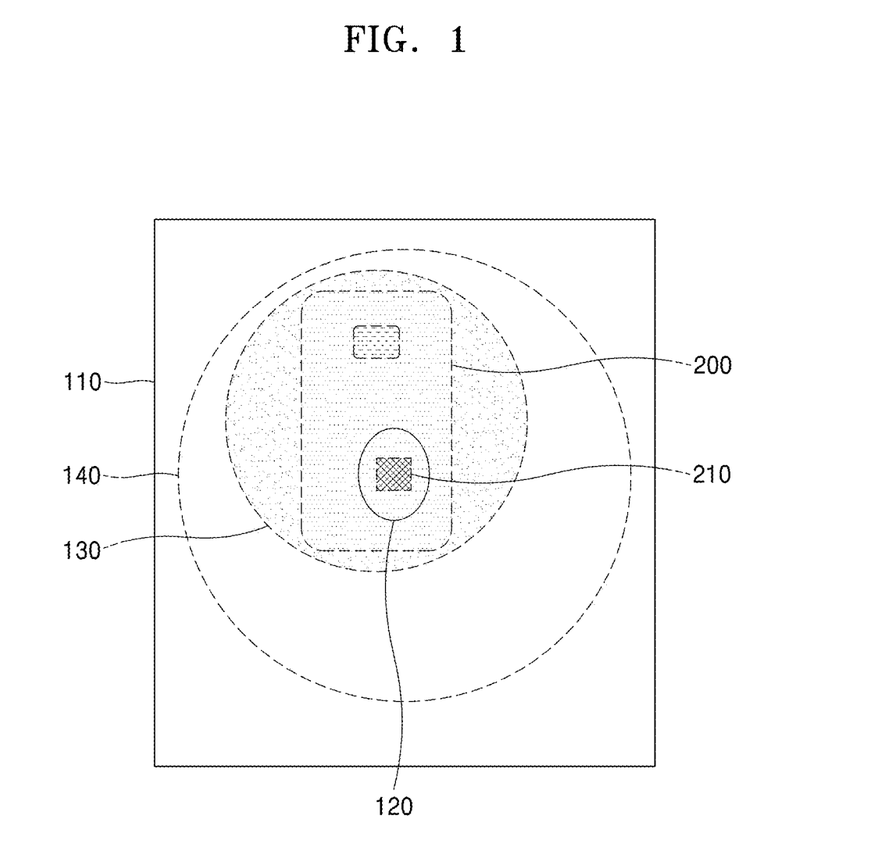
FIG. 1 is a schematic diagram of a fingerprint enrolling device according to an embodiment.

FIG. 1 illustrates a schematic diagram of a fingerprint enrolling device according to an embodiment.

Referring to FIG. 1, FIG. 1 includes a fingerprint enrolling device 100 and a smart card 200. The smart card 200 may be inserted into the fingerprint enrolling device 100 and may communicate with the fingerprint enrolling device 100. The smart card 200 may include a fingerprint sensor 210 for capturing a fingerprint of a user, the fingerprint sensor 210 here is provided as an example, and the smart card 200 may include any module having a fingerprint capturing function, and the disclosure is not necessarily limited to this approach.

The fingerprint enrolling device 100 may be used to enroll fingerprint images, and may also be used to verify a user's fingerprint after the fingerprint images has been successfully enrolled to generate fingerprint templates. The fingerprint enrolling device 100 may include an enrolling device housing 110, a finger opening 120, and an actuator 130. The finger opening 120 may be provided, for example, on the enrolling device housing 110 for placing a user's fingertip, and the actuator 130 may fix thereon the smart card 200 to drive the smart card 200 to move such that the fingerprint enrolling device 100 may move (e.g., pan and rotation) the smart card 200 when enrolling the fingerprint. The fingerprint enrolling device 100 may be connected to an external electronic device (such as, a desktop computer, a laptop computer, a handheld computer, a notebook computer, a tablet computer, a netbook, a personal digital assistant (PDA), an augmented reality (AR)/a virtual reality (VR), a mobile phone, and other devices). Furthermore, the fingerprint enrolling device 100 may include a storage medium, a controller, and a motor, wherein controlling movement of the smart card 200 may be realized by software stored on the storage medium, and the software is executed by the controller to control the motor to drive movement of the actuator 130, and thereby control (e.g., drive) the movement of the smart card 200. Further, the fingerprint enrolling device 100 may also include a maximum trajectory 140 of the actuator 130, and the movement of the actuator 130 may be constrained within the maximum trajectory 140 for the purpose of the fingerprint sensor 210 of the smart card 200 always being underneath the position of the finger opening 120. Wherein the maximum trajectory 140 of the actuator 130 may be a physical constraint on the movement of the actuator 130 in the fingerprint enrolling device 100 and/or may be implemented by software. For example, the physical constraint provided in the fingerprint enrolling device 100 prevents the actuator 130 from moving beyond the maximum trajectory 140 and the actuator 130 is ensured to move within the maximum trajectory 140 when the software is used to set translational positions and/or rotational angles. As a result, the fingerprint enrolling device 100 controls the smart card 200 to translate at any position and rotate at any angle with precise control, but the fingerprint sensor 210 of the smart card 200 is always underneath the position of the finger opening 120 regardless of the translation and rotation.

It should be understood that the schematic diagram of the fingerprint enrolling device is provided here as an example, and the structure and description of the fingerprint enrolling device and the smart card are also provided as examples. For example, the smart card in the disclosure may also be a card integrated in the fingerprint enrolling device, and the fingerprint enrolling device may include a device that requires verification of a fingerprint, such as a smart phone, a smart lock, a smart home appliance, etc., at which point the fingerprint enrolling device may enroll a fingerprint using the fingerprint enrolling method of the disclosure and subsequently be used to verify the fingerprint. The disclosure is not necessarily limited to these approaches.

Figure 2:
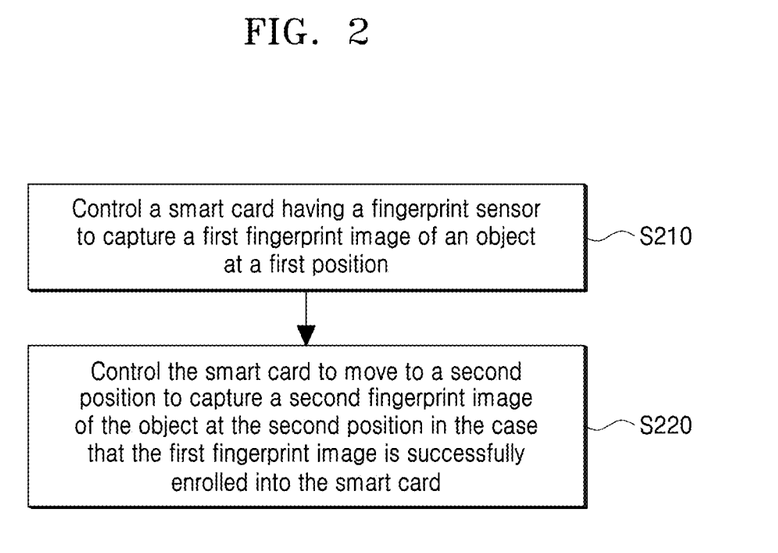
FIG. 2 is a flowchart of a fingerprint enrolling method according to an embodiment.

FIG. 2 is a flowchart of a fingerprint enrolling method according to an embodiment. This fingerprint enrolling method is applied to a fingerprint enrolling device, which is described below taking the fingerprint enrolling device 100 and the smart card 200 shown in FIG. 1 as an example.

Referring to FIG. 2, in operation S210, a smart card having a fingerprint sensor is controlled to capture a first fingerprint image of an finger at a first position, wherein the finger may be a finger of the user to be enrolled the fingerprint.

In example embodiments, the smart card having the fingerprint sensor may first be inserted into the fingerprint enrolling device, and then the user may place the finger to be enrolled the fingerprint at the finger opening of the fingerprint enrolling device. For example, the user may insert the smart card and place the finger at the finger opening under the prompt of the fingerprint enrolling device. The user (or another user) may click to start the enrolling of the fingerprint, wherein the fingerprint enrolling device may be connected to an external electronic device, a button on the fingerprint enrolling device may be touched to start the enrolling of the fingerprint, or a button on the external electronic device may be clicked (e.g., a button on the computer display) to control or notify the fingerprint enrolling device to start the enrolling of the fingerprint.

In example embodiments, the smart card may be fixed to the actuator after being inserted into the fingerprint enrolling device, at which point the smart card may be in an initial position. After the fingerprint enrolling device starts the enrolling of the fingerprint, the fingerprint enrolling device may control the smart card having a fingerprint sensor to capture a first fingerprint image of a finger at a first position (e.g., an initial position).

In operation S220, the smart card is controlled to move to a second position to capture a second fingerprint image of the finger at the second position in the case that the first fingerprint image is successfully enrolled into the smart card.

According to example embodiments, the fingerprint enrolling device may include an actuator, and the fingerprint enrolling device may control the actuator to drive the smart card to move.

In example embodiments, the fingerprint enrolling device may control the movement of the smart card, and move the smart card to a different position (e.g., a second position) of a fingertip of the user's finger to be enrolled, such that the fingerprint sensor on the smart card captures a fingerprint image (e.g., a second fingerprint image) of the user's finger to be enrolled. For example, software may be stored in the fingerprint enrolling device, which controls a motor in the fingerprint enrolling device, and the motor controls the actuator to move, for example, with one or more gears, rods, etc. thereby driving the movement of the smart card.

According to example embodiments, the fingerprint enrolling device may control the smart card to move to a next position among a specified number of positions to capture a fingerprint image of the finger in the case that enrolling at the specified number of positions is not completed, wherein the first position and the second position may be two consecutive positions among the specified number of positions. The specified number of positions may be determined based on a translational position and/or a rotational angle of the smart card.

Figure 3A:
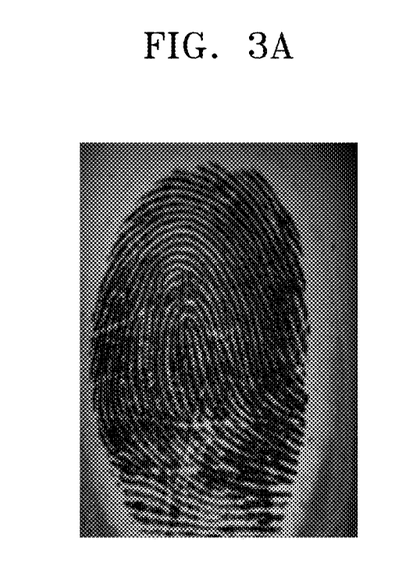
FIG. 3A is a picture of a full fingerprint according to an embodiment.

In example embodiments, the specified number of positions may be preset in the fingerprint enrolling device, and the specified number of positions may be determined based on the translational position and/or the rotational angle of the smart card. For example, the specified number of positions determined based on the translational position and/or the rotational angle of the smart card may be written to a storage medium of the fingerprint enrolling device. FIG. 3A is a picture of a full fingerprint according to an embodiment. FIGS. 3B-3H are pictures of a fingerprint image according to an embodiment. Referring to FIGS. 3B-3H, the specified number herein may be, for example, seven, and the seven positions determined based on the translational position and/or the rotational angle of the smart card include, in order a center no-rotation position (e.g., position 1 of FIG. 3B), a leftward translation no-rotation position (e.g., position 2 of FIG. 3C), a rightward translation no-rotation position (e.g., position 3 of FIG. 3D), an upward translation no-rotation position (e.g., position 4 of FIG. 3E), a downward translation no-rotation position (e.g., position 5 of FIG. 3F), a center leftward 30-degree rotation position (e.g., position 6 of FIG. 3G), and a center rightward 30-degree rotation position (e.g., position 7 of FIG. 3H), wherein the center denotes no-translation, and the translations and rotations here may be translations and rotations with respect to the initial position of the smart card after it is inserted in the fingerprint enrolling device. In addition, the translational distance and/or the rotational angle may be specified by using the center of the finger opening as the origin of the coordinate system, for example, a leftward translation of 2 mm and rotation of 30 degrees. By presetting the specified number of positions, the disclosure may realize the movement of the smart card at any position and angle, thereby realizing the enrolling of the fingerprint image at any position and angle.

It should be understood that the specified number and the translational positions and/or rotational angles of the smart card here are only examples, and the disclosure is not necessarily limited thereto.

Figure 3B:
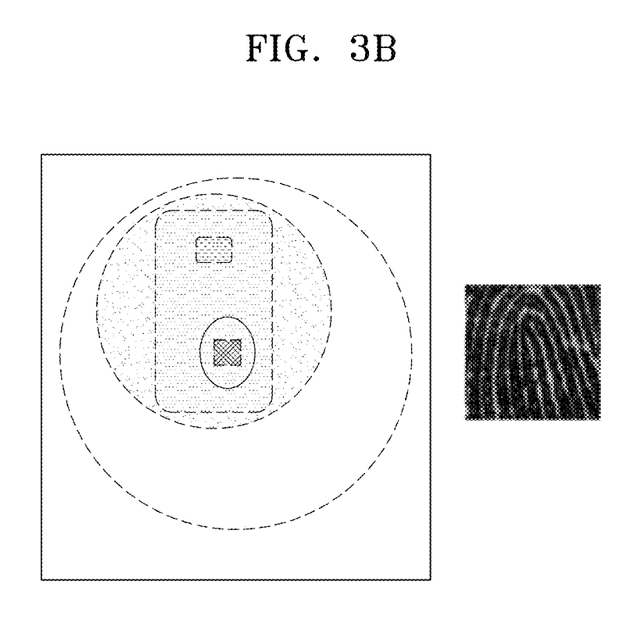
FIGS. 3B-3H is a picture of a fingerprint image according to an embodiment.
Figure 3C:
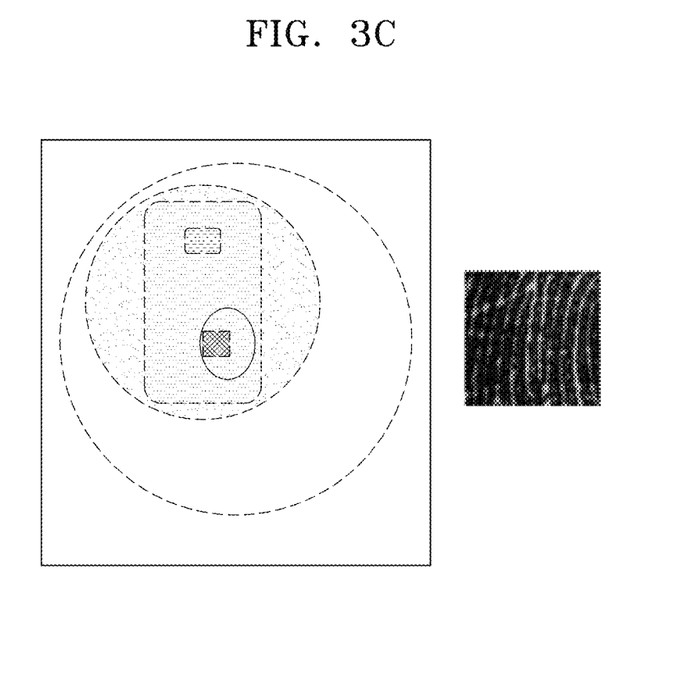
Figure 3D:
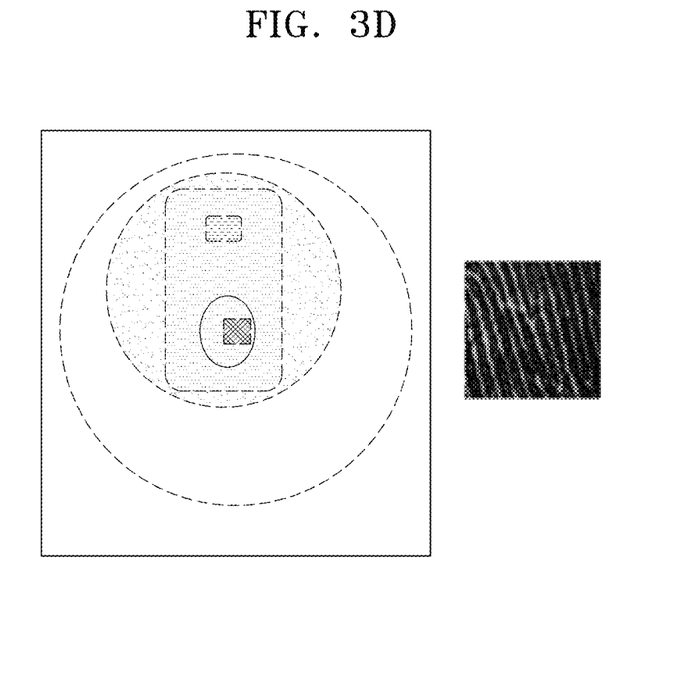
Figure 3E:
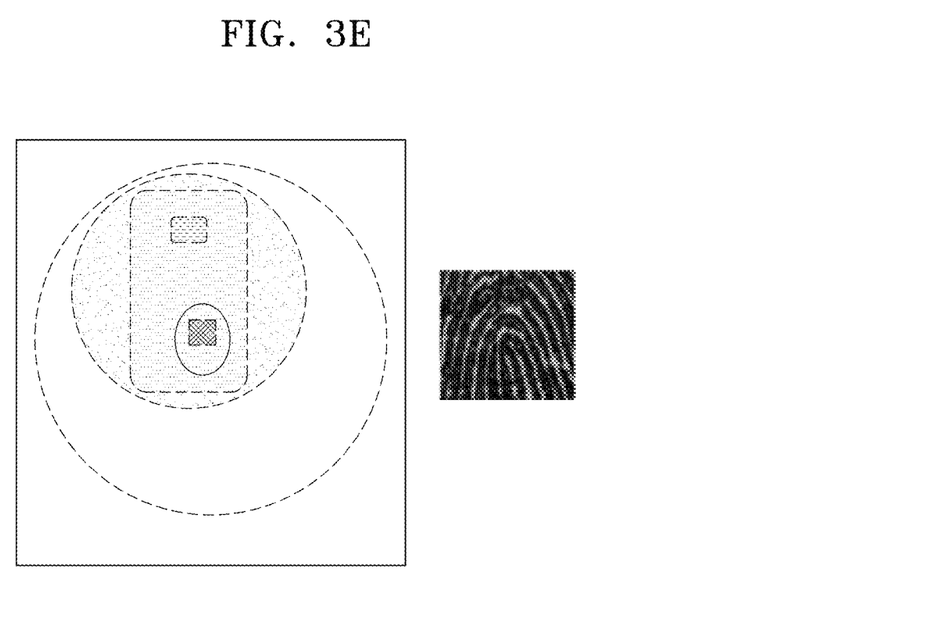
Figure 3F:
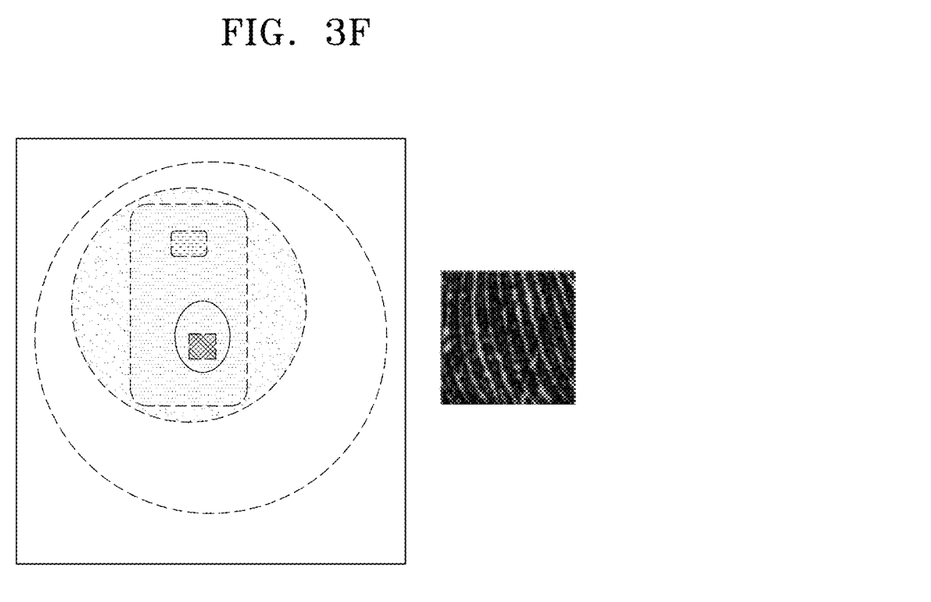
Figure 3G:
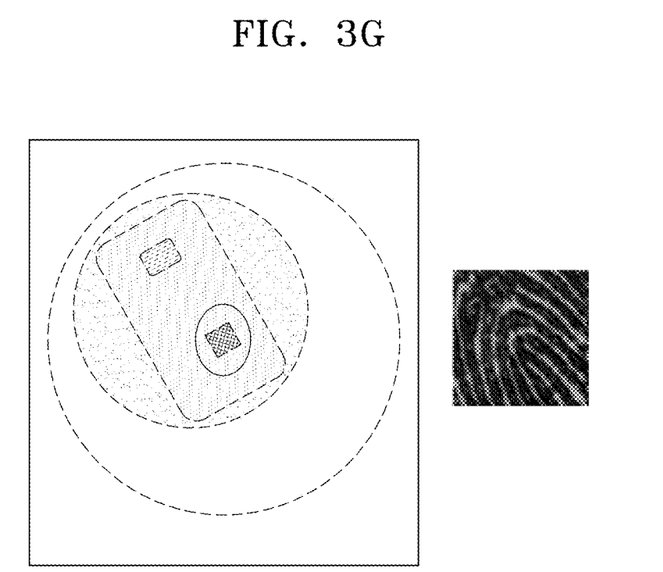
Figure 3H:
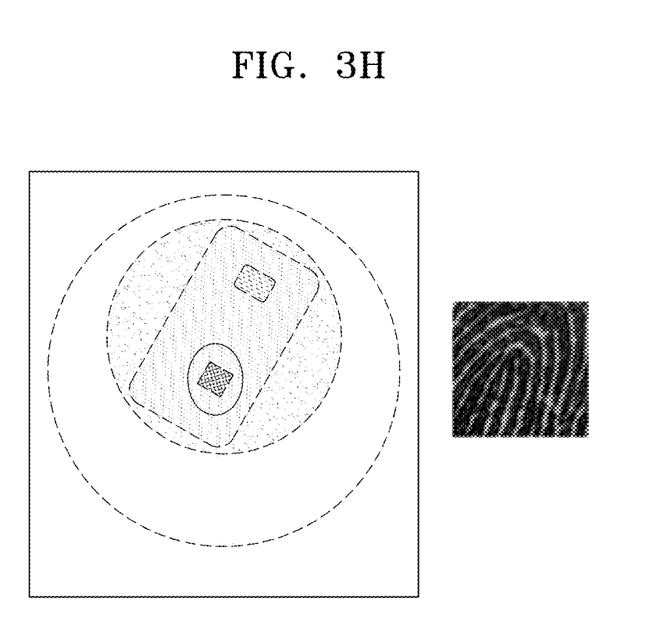

In embodiments, after the fingerprint enrolling device starts the enrolling of the fingerprint, the smart card is not moved at first, the smart card may be in an initial position (e.g., a center (no-translation) no-rotation position), and the fingerprint enrolling device controls the smart card having the fingerprint sensor to capture a fingerprint image of the finger at the initial position (e.g., position 1 of FIG. 3B). In the case that the fingerprint image is successfully enrolled into the smart card (i.e., the capture is deemed to be adequate), the fingerprint enrolling device may determine whether the enrolling at the specified number of positions is completed. Here, the specified number of positions is, for example, 7 positions, and at this time, the fingerprint image of only 1 position (e.g., position 1) is enrolled, and the enrolling at the specified number of positions is not completed. In the case that the enrolling at the specified number of positions is not completed, the fingerprint enrolling device may control the smart card to move to a next position (e.g., position 2 of FIG. 3C) among the specified number of positions to capture a fingerprint image of the finger. For example, software stored in the fingerprint enrolling device controls the motor and thus controls the actuator to translate and/or rotate according to the preset specified number of positions, while driving the smart card to translate or rotate to the next position (e.g., position 2 of FIG. 3C). The fingerprint image of the finger is captured by the fingerprint sensor on the smart card at the next position (e.g., position 2 of FIG. 3C). Similarly, the fingerprint enrolling device, in the case that the fingerprint image is successfully enrolled into the smart card, may then determine whether the enrolling at the specified number of positions is completed, the specified number of positions here is 7 positions, and at this time, the fingerprint image of only 2 positions (position 1 and position 2) are enrolled, and the enrolling at the specified number of positions is not completed. In the case that the enrolling at the specified number of positions is not completed, the fingerprint enrolling device may control the smart card to move to a next position (e.g., position 3 of FIG. 3D) among the specified number of positions to capture a fingerprint image of the finger. The fingerprint enrolling device may then repeat the above operations until all of the specified number of positions (e.g., positions 1 to 7) are traversed, for example, until the enrolling at the specified number of positions is completed. At this time, the preset specified number of positions are successfully enrolled into the smart card, and the enrolling procedure is completed. Here, the first position may be, for example, position 1 of FIG. 3B, and the corresponding second position may be position 2 of FIG. 3C. The first position may be, for example, position 2 of FIG. 3C, and the corresponding second position may be position 3 of FIG. 3D. However, the first position and the second position are not necessarily limited thereto, and the first position and the second position may be two consecutive positions in the specified number (e.g., 7) of positions.

According to example embodiments, the fingerprint enrolling device may receive from the smart card a signal indicating that the first fingerprint image is successfully enrolled into the smart card, and may control the smart card to move to the second position to capture the second fingerprint image of the finger at the second position in the case of receiving the signal indicating that the first fingerprint image is successfully enrolled into the smart card. Wherein the signal indicating that the first fingerprint image is successfully enrolled into the smart card may be generated based on the first fingerprint image satisfying a predetermined condition, the predetermined condition may include a quality of the first fingerprint image satisfying a predetermined quality requirement. In addition, the first fingerprint image of the finger may be recaptured by the smart card at the first position in the case that the first fingerprint image is not successfully enrolled into the smart card (e.g., where the captured image does not satisfy the predetermined quality requirements).

In example embodiments, the smart card may include a smart card chip, and the smart card chip may include a corresponding algorithm to determine whether the fingerprint image (e.g., the first fingerprint image) captured by the fingerprint sensor satisfies a predetermined condition. For example, the predetermined condition may include a quality of the fingerprint image satisfies a predetermined quality requirement (e.g., a quality of the fingerprint image is greater than a quality threshold), wherein the quality of the fingerprint image may be, for example, a definition of the fingerprint image, etc., and wherein the predetermined quality requirement may be a quality threshold such as a default value, an empirical value, or a calculated optimal value, however, the disclosure is not necessarily limited to this particular approach. The enrolling of the fingerprint image (e.g., the first fingerprint image) here may be that the smart card (e.g., utilizing a corresponding algorithm) captures key information in the fingerprint image to generate a fingerprint template, and stores the generated fingerprint template in the smart card. Therefore, the smart card performs the operation of capturing the key information and generating the template only if the quality of the fingerprint image satisfies the predetermined quality requirement. In addition, since only the key information is extracted to generate the fingerprint template and then stored, the purpose of saving storage resources of the smart card may be achieved.

In example embodiments, in the case that the fingerprint image (e.g., the first fingerprint image) satisfies the predetermined condition, the fingerprint image may be enrolled into the smart card, whereby the smart card may transmit to the fingerprint enrolling device a signal indicating that the fingerprint image is successfully enrolled, for example, the signal indicating that the fingerprint image (e.g., the first fingerprint image) is successfully enrolled into the smart card may be generated based on the fingerprint image satisfying the predetermined condition. Accordingly, the fingerprint enrolling device may receive, from the smart card, the signal indicating that the fingerprint image is successfully enrolled into the smart card. In the case that the fingerprint image does not satisfy the predetermined condition, the fingerprint image is not enrolled into the smart card and is discarded (i.e., not successfully enrolled into the smart card), the smart card may control the fingerprint sensor to recapture the fingerprint image of the finger at the position where the enrolling was not successful (e.g., the first position), and the smart card may re-determine whether the captured fingerprint image satisfies the predetermined condition and, similarly, the corresponding operations described above are re-executed in the case that the predetermined conditions are not satisfied.

In example embodiments, accordingly, on one hand, the fingerprint enrolling device may receive from the smart card the signal indicating that the fingerprint image (e.g., the first fingerprint image) is successfully enrolled into the smart card, and may control the smart card to move to a next position (e.g., the second position) to capture the fingerprint image of the finger at that position in the case of receiving the signal indicating that the fingerprint image is successfully enrolled into the smart card. For example, in the case of receiving the signal indicating that the fingerprint image (e.g., the first fingerprint image) is successfully enrolled into the smart card, it may be determined whether the enrolling at the specified number of positions is completed and, in the case that the enrolling at the specified number of positions is not completed, the smart card may be controlled to move to the next position (e.g., the second position) among the specified number of positions to capture the fingerprint image of the finger (e.g., the second fingerprint image). On the other hand, in the case that the signal indicating that the fingerprint image is successfully enrolled into the smart card is not received from the smart card, the fingerprint enrolling device may wait until the signal is received. Alternatively, a response time may be provided within which the smart card may capture the fingerprint image multiple times, and in the case that the fingerprint enrolling device does not receive the signal indicating that the fingerprint image is successfully enrolled into the smart card after waiting for the response time (e.g., 5 seconds), the fingerprint enrolling device may prompt to the user that the enrolling of the fingerprint image is failed and may request the user to reposition the finger in the finger opening, and thus the procedure of the fingerprint enrolling method may be restarted. At this time, the fingerprint enrolling device may control the smart card to move to the initial position (also the first position of the specified number of positions) to restart the procedure of the fingerprint enrolling method.

In example embodiments, the movement of the actuator may be constrained to be within a maximum trajectory, and the fingerprint sensor may always be underneath the finger opening in case of the movement of the smart card. The maximum trajectory of the actuator may be implemented by software to constrain the movement of the actuator within the maximum trajectory. During the entire period of enrolling of the fingerprint image, after the user presses the finger, the finger is not lifted until the end of the enrolling procedure, and the fingerprint sensor of the smart card is always underneath the position of the finger opening regardless of how the smart card being translated and rotated.

In the example embodiment, if the enrolling at the specified number of positions is completed, fingerprint images satisfying the predetermined condition are enrolled by the smart card at the specified number of positions preset in the fingerprint enrolling device, and the enrolling procedure is completed. Since the fingerprint template is stored in the smart card, the fingerprint image to be verified may be obtained at fingerprint verification, and key information of the fingerprint image to be verified is also extracted to generate a fingerprint template to be verified, so that matching between the existing fingerprint template and the fingerprint template to be verified may be performed. In the disclosure, subsequently, when verifying the fingerprint, since the specified number (e.g., the specified number is 7) of fingerprint templates have been stored in the smart card, a verification method may, for example, include calculating matching scores between the specified number of fingerprint templates and the fingerprint template to be verified in order, and in the case that the matching score between the fingerprint template to be verified and any one of the fingerprint templates is higher than the specified threshold, the fingerprint to be verified is verified successfully.

According to the fingerprint enrolling method of the above-described embodiment, dependency on the user when fingerprint image being enrolled is reduced and the diversity of enrolled templates is increased, by controlling the movement of the smart card (e.g., translation and rotation) instead of the user's finger. Also, the movement of the smart card may be automatically controlled, which is accurate, easy to use and efficient.

Figure 4:
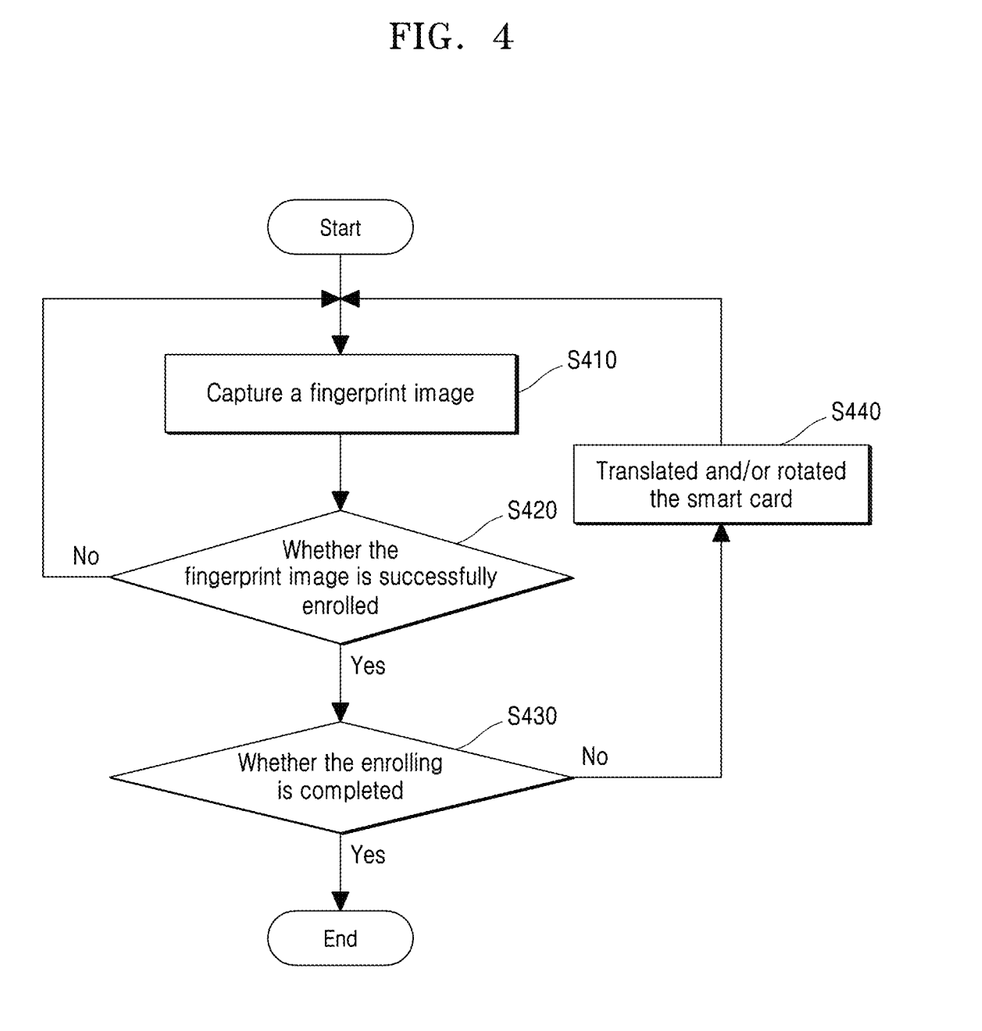
FIG. 4 is an implementation flowchart of a fingerprint enrolling method according to an embodiment.

FIG. 4 illustrates an implementation flowchart of a fingerprint enrolling method, according to an embodiment, which is described below taking the fingerprint enrolling device 100 and the smart card 200 shown in FIG. 1 as an example.

Referring to FIG. 4, the smart card may be inserted into the fingerprint enrolling device, a user may place a finger to be enrolled at the finger opening of the fingerprint enrolling device, and then the enrolling of the fingerprint may be started by a click.

In operation S410, a fingerprint image is captured. For example, the smart card captures the fingerprint image at the current position. After the fingerprint enrolling device starts the enrolling of the fingerprint, the smart card is not moved at first, and the fingerprint enrolling device controls the smart card having the fingerprint sensor to capture the fingerprint image (e.g., a first fingerprint image) of the finger at the current position (a first position, e.g., position 1 of FIG. 3B).

In operation S420, it is determined whether the fingerprint image is successfully enrolled. For example, the smart card determines whether the fingerprint image (e.g., the first fingerprint image) is successfully enrolled. The smart card may determine whether the fingerprint image is enrolled by determining whether the fingerprint image satisfies a predetermined condition. In the case that the smart card determines that the fingerprint image does not satisfy the predetermined condition, the fingerprint image is discarded and it returns to operation S410 in which the smart card recaptures the fingerprint image (e.g., the first fingerprint image). In the case that the smart card determines that the fingerprint image satisfies the predetermined condition, the fingerprint image is (successfully) enrolled into the smart card, for example, a corresponding fingerprint template is generated and stored in the smart card. The smart card may transmit a signal to the fingerprint enrolling device indicating that the fingerprint image is successfully enrolled, and the procedure proceeds to operation S430.

In the operation S430, it is determined whether the enrolling is completed. For example, the fingerprint enrolling device determines whether the enrolling at the specified number of positions is completed. The fingerprint enrolling device, after receiving the signal from the smart card indicating that the fingerprint image is successfully enrolled, determines whether the enrolling at the specified number of positions is completed. If the enrolling at the specified number of positions is completed (e.g., the specified number is 7, and the fingerprint image of, for example, position 7 of FIG. 3H has been enrolled), fingerprint images satisfying the predetermined condition are enrolled at the specified number of positions preset in the fingerprint enrolling device, and the enrolling procedure is completed. If the enrolling at the specified number of positions is not completed (e.g., the specified number is 7, and the fingerprint image of, for example, position 1 of FIG. 3B, i.e., a first fingerprint image, has been enrolled), the procedure proceeds to operation S440.

In the operation S440, the smart card is translated and/or rotated. For example, the fingerprint enrolling device translates and/or rotates the smart card. In the case that the enrolling at the specified number of positions is not completed (e.g., the first position is position 1 as in FIG. 3B), the fingerprint enrolling device may control the smart card to move to a next position among the specified number of positions (the second position, e.g., the leftward translating without rotating the smart card to position 2 as in FIG. 3C), and the operation S410 to the operation S440 are continued.

Figure 5:
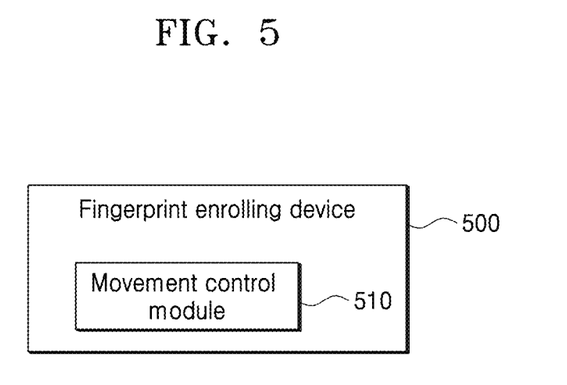
FIG. 5 is a block diagram illustrating a fingerprint enrolling device according to an embodiment.

FIG. 5 is a diagram illustrating a fingerprint enrolling device according to an embodiment.

Referring to FIG. 5, the fingerprint enrolling device 500 may include a movement controller 510. The movement controller 510 may control a smart card having a fingerprint sensor to capture a first fingerprint image of an finger in a first position; and control the smart card to move to a second position to capture a second fingerprint image of the finger at the second position in the case that the first fingerprint image is successfully enrolled into the smart card.

According to example embodiments, the movement controller 510 may also control the smart card to move to a next position among a specified number of positions to capture a fingerprint image of the finger, in the case that the enrolling at the specified number of positions is not completed, wherein the first position and the second position are two consecutive positions among the specified number of positions.

According to example embodiments, the specified number of positions may be determined based on a translational position and/or a rotational angle of the smart card.

According to example embodiments, the fingerprint enrolling device 500 may further include a signal receiving module 520. The signal receiving module 520 may receive from the smart card a signal indicating that the first fingerprint image is successfully enrolled into the smart card. And, the movement controller 510 may control the smart card to move to the second position to capture the second fingerprint image of the finger at the second position in the case that the signal indicating that the first fingerprint image is successfully enrolled into the smart card is received.

According to example embodiments, the signal indicating that the first fingerprint image is successfully enrolled into the smart card may be generated based on the first fingerprint image satisfying a predetermined condition, the predetermined condition may include a quality of the first fingerprint image satisfying a predetermined quality requirement.

According to example embodiments, the first fingerprint image of the finger is recaptured by the smart card at the first location in the case that the first fingerprint image is not successfully enrolled into the smart card.

According to example embodiments, the fingerprint enrolling device 500 may further include an actuator 530. The movement controller 510 may also control movement of the actuator 530 to drive the smart card to move.

According to the fingerprint enrolling device of the above-described embodiment, dependency on the user when fingerprint image being enrolled is reduced and the diversity of enrolled templates is increased, by controlling the movement of the smart card (e.g., translation and rotation) instead of the user's finger. Also, the movement of the smart card may be automatically controlled, which is accurate, easy to use and efficient.

Figure 6:
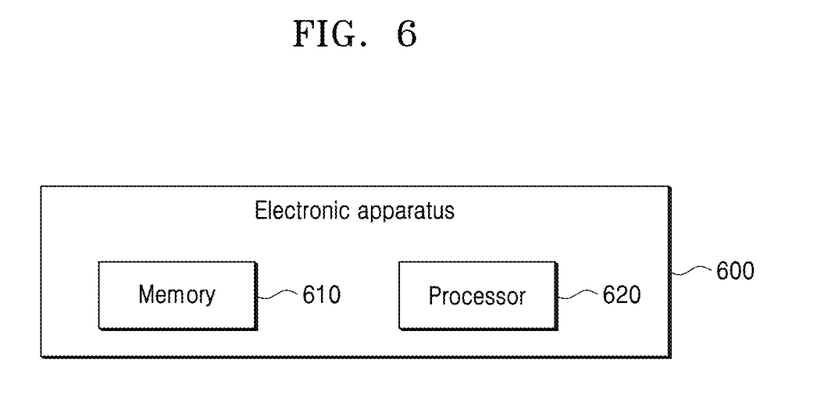
FIG. 6 is a block diagram of an electronic apparatus according to an embodiment.

FIG. 6 is a block diagram illustrating an electronic apparatus according to an embodiment. An electronic apparatus 600 may be the fingerprint enrolling device, according to embodiments of the disclosure. Referring to FIG. 6, the electronic apparatus 600 may include at least one memory 610 and at least one processor 620. The at least one memory may store a set of computer executable instructions therein, and the set of computer executable instructions, when executed by the at least one processor, may implement the fingerprint enrolling method according to embodiments of the disclosure.

Here, the electronic device might not be a single electronic device, but may also be any collection of devices or circuits capable of executing the instructions (or instruction set) individually or in combination. The electronic device may also be part of an integrated control system or system manager, or may be configured to be an electronic device connecting local or remote (e.g., via wireless transmission) with an interface.

In an electronic device, the processor may include a central processing unit (CPU), a graphic processing unit (GPU), a programmable logic device, a dedicated processor system, a microcontroller, or a microprocessor. As an example, a processor may also include an analog processor, a digital processor, a microprocessor, a multi-core processor, a processor array, a network processor, and the like.

The processor may run instructions or code stored in the memory, wherein the memory may also store data. The instructions and data may also be sent, and received, over a network via a network interface device, wherein the network interface device may employ any known transmission protocol.

The memory may be integrated with the processor, for example, by arranging RAM or flash memory within an integrated circuit microprocessor. In addition, the memory may comprise a separate device, such as an external disk drive, a storage array, or any other storage device that may be used by the database system. The memory and the processor may be operationally coupled or may communicate with each other, for example, via I/O ports, network connections, etc., so that the processor may read the files stored in the memory.

In addition, the electronic device may also include a video display (e.g., LCD) and a user interaction interface (such as a keyboard, mouse, touch input device, etc.). All components of the electronic device may be connected to each other via a bus and/or network.

According to embodiments of the disclosure, a computer-readable storage medium may also be provided, wherein a computer program is stored thereon, the program, when executed, may implement the method for the cellular vehicle-to-everything according to the present disclosure. Examples of computer-readable storage media herein include read-only memory (ROM), random access programmable read-only memory (PROM), electrically erasable programmable read-only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disk memory, hard disk drive (HDD), solid state drive (SSD), card-based memory (such as, multimedia cards, Secure Digital (SD) cards or Extreme Digital (XD) cards), magnetic tapes, floppy disks, magneto-optical data storage devices, optical data storage devices, hard disks, solid state disks, and any other device, where the other device is configured to store the computer programs and any associated data, data files, and data structures in a non-transitory manner and to provide the computer programs and any associated data, data files, and data structures to a processor or computer, so that the processor or computer may execute the computer program. The computer program in the computer readable storage medium may run in an environment deployed in a computer device such as a terminal, client, host, agent, server, etc., and furthermore, in one example, the computer program and any associated data, data files and data structures are distributed on a networked computer system such that the computer program and any associated data, data files and data structures are stored, accessed, and executed in a distributed manner by one or more processors or computers.

According to the fingerprint enrolling method and the fingerprint enrolling device of the embodiments of the disclosure, dependency on the user when fingerprint image being enrolled is reduced and the diversity of enrolled templates is increased, by controlling the movement of the smart card (e.g., translation and rotation) instead of the user's finger. Also, the movement of the smart card may be automatically controlled, which is accurate, easy to use and efficient.

Other embodiments of the disclosure will readily come to the mind of those skilled in the art upon consideration of the specification and practice of the inventive concepts disclosed herein. This application is intended to cover any variations, uses, or adaptations of the present disclosure that follow the general principles of the disclosure and include commonly known or customary technical means in the art that are not disclosed herein. Embodiments provided in the specification are merely examples, and the scope and spirit of the disclosure is not necessarily limited thereby.

It is to be understood that the disclosure is not necessarily limited to the precise structure already described above and illustrated in the accompanying drawings, and that various modifications and changes may be made without departing from its scope.

What is claimed is:

1. A fingerprint enrolling method, applied to a fingerprint enrolling device, the method comprising:
controlling a smart card, comprising a fingerprint sensor, to capture a first fingerprint image of a finger at a first position; and
controlling the smart card to move to a second position to capture a second fingerprint image of the finger at the second position, when the first fingerprint image is successfully captured.

2. The method of claim 1, wherein the method further comprises:
controlling the smart card to move to a third position, among a specified number of positions, to capture a third fingerprint image of the finger, when the second fingerprint image is successfully captured, wherein the second position and the third position are two consecutive positions among the specified number of positions.

3. The method of claim 2, wherein the specified number of positions are determined based on a translational position and/or a rotational angle of the smart card.

4. The method of claim 1, wherein the method further comprises: receiving from the smart card a signal indicating that the first fingerprint image is successfully captured;
wherein the controlling the smart card to move to the second position to capture the second fingerprint image of the finger at the second position when the first fingerprint image is successfully captured comprises:
controlling the smart card to move to the second position to capture the second fingerprint image of the finger at the second position when the signal is received.

5. The method of claim 4, wherein the signal is generated when the first fingerprint image satisfies a predetermined condition, the predetermined condition comprising: a quality of the first fingerprint image satisfying a predetermined quality requirement.

6. The method of claim 1, wherein the first fingerprint image of the finger is recaptured by the smart card at the first position when the first fingerprint image is not successfully captured.

7. The method of claim 1, wherein the fingerprint enrolling device comprises an actuator, the controlling of the smart card to move comprising:
controlling movement of the actuator to drive the smart card to move to the second position.

8. A fingerprint enrolling device, the device comprising: a movement controller, the movement controller configured to:
control a smart card having a fingerprint sensor to capture a first fingerprint image of a finger at a first position; and
control the smart card to move to a second position to capture a second fingerprint image of the finger at the second position when the first fingerprint image is successfully captured.

9. The device of claim 8, wherein the movement controller module is further configured to:

control the smart card to move to a third position among a specified number of positions to capture a third fingerprint image of the finger, when the second fingerprint image is successfully captured, wherein the second position and the third position are two consecutive positions among the specified number of positions.

10. The device of claim 9, wherein the specified number of positions are determined based on a translational position and/or a rotational angle of the smart card.

11. The device of claim 8, wherein the device further comprises: a signal receiver, the signal receiver configured to: receive from the smart card a signal indicating that the first fingerprint image is successfully captured;
wherein the movement controller is further configured to:
control the smart card to move to the second position to capture the second fingerprint image of the finger at the second position when the signal is received.

12. The device of claim 11, wherein the signal is generated when the first fingerprint image satisfies a predetermined condition, the predetermined condition comprising: a quality of the first fingerprint image satisfying a predetermined quality requirement.

13. The device of claim 8, wherein
the first fingerprint image of the finger is recaptured by the smart card at the first position when the first fingerprint image is not successfully captured.

14. The device of claim 8, wherein the device further comprises: an actuator, the actuator configured to:
drive the smart card to move under the control of the movement controller.

15. A computer-readable storage medium, wherein a computer program is stored thereon, the program when executed implementing a fingerprint enrolling method, applied to a fingerprint enrolling device, the method comprising:
controlling a smart card, comprising a fingerprint sensor, to capture a first fingerprint image of a finger at a first position; and
controlling the smart card to move to a second position to capture a second fingerprint image of the finger at the second position, when the first fingerprint image is successfully captured.

16. The computer-readable storage medium of claim 15, the method further comprising:
controlling the smart card to move to a third position, among a specified number of positions, to capture a third fingerprint image of the finger, when the second fingerprint image is successfully captured, wherein the second position and the third position are two consecutive positions among the specified number of positions.

17. The computer-readable storage medium of claim 16, wherein the specified number of positions is determined based on a translational position and/or a rotational angle of the smart card.

18. The computer-readable storage medium of claim 15, wherein the method further comprises:
receiving from the smart card a signal indicating that the first fingerprint image is successfully captured;
wherein the controlling the smart card to move to the second position to capture the second fingerprint image of the finger at the second position when the first fingerprint image is successfully captured comprises:
controlling the smart card to move to the second position to capture the second fingerprint image of the finger at the second position when the signal is received.

19. The computer-readable storage medium of claim 18, wherein the signal is generated when the first fingerprint image satisfies a predetermined condition, the predetermined condition comprising: a quality of the first fingerprint image satisfying a predetermined quality requirement.

20. The computer-readable storage medium of claim 15, wherein the first fingerprint image of the finger is recaptured by the smart card at the first position when the first fingerprint image is not successfully captured.

* * * * *